United States Patent
Blank

(10) Patent No.: US 11,442,780 B2
(45) Date of Patent: Sep. 13, 2022

(54) SYSTEMS AND METHODS FOR REAL-TIME PROCESSING

(71) Applicant: THE BANK OF NEW YORK MELLON, New York, NY (US)

(72) Inventor: Brian Blank, New York, NY (US)

(73) Assignee: The Bank of New York Mellon, New York, NY (US)

( * ) Notice: Subject to any disclaimer, the term of this patent is extended or adjusted under 35 U.S.C. 154(b) by 0 days.

(21) Appl. No.: 17/384,182

(22) Filed: Jul. 23, 2021

(65) Prior Publication Data
US 2022/0043685 A1 Feb. 10, 2022

Related U.S. Application Data

(63) Continuation-in-part of application No. 15/136,596, filed on Apr. 22, 2016, now abandoned.

(60) Provisional application No. 62/151,247, filed on Apr. 22, 2015.

(51) Int. Cl.
*G06F 9/50* (2006.01)

(52) U.S. Cl.
CPC .................. *G06F 9/5027* (2013.01)

(58) Field of Classification Search
None
See application file for complete search history.

(56) References Cited

U.S. PATENT DOCUMENTS

| | | | |
|---|---|---|---|
| 5,101,353 A | 3/1992 | Lupien | |
| 6,018,721 A | 1/2000 | Aziz et al. | |
| 7,577,601 B1 | 8/2009 | Rademacher et al. | |
| 7,596,526 B2 | 9/2009 | Blauvelt | |
| 7,660,762 B1 | 2/2010 | Mellina | |
| 7,949,593 B2 | 5/2011 | Norris | |
| 8,112,331 B2 | 2/2012 | Getty | |
| 8,131,627 B2* | 3/2012 | Sadre | G06Q 40/04 705/37 |
| 8,145,552 B2* | 3/2012 | Blank | G06Q 40/12 705/30 |
| 8,346,647 B1 | 1/2013 | Phelps | |

(Continued)

OTHER PUBLICATIONS

M. Singh et al., "The (sizable) Role of Rehypothecation in the Shadow Banking System", IMF Working Paper, Monetary and Capital Markets Department, Jul. 2010, 16 pgs.

*Primary Examiner* — Hiren P Patel
(74) *Attorney, Agent, or Firm* — Pillsbury Winthrop Shaw Pittman, LLP

(57) ABSTRACT

A method for real-time data processing is described. The method being implemented on a computer system having one or more physical processors programmed with computer program instructions which, when executed, perform the method. The method comprising allocating a real-time dataset associated with a real-time data interaction to a node in a chain of nodes, wherein each node is representative of a user in the real-time data interaction; setting a node status of the node for the real-time dataset to pending; and independently of (i) a node status of the one or more upstream nodes and (ii) a node status of the one or more downstream nodes: periodically determining, by the computer system, an availability status of the node; and in response to the availability status satisfying the criterion, setting the node status for the real-time dataset as settled.

20 Claims, 13 Drawing Sheets

(56) References Cited

U.S. PATENT DOCUMENTS

| | | |
|---|---|---|
| 8,370,236 B1 | 2/2013 | Bent |
| 8,655,765 B1 | 2/2014 | Gastineau |
| 9,135,661 B2 | 9/2015 | Chacko |
| 9,710,853 B2 * | 7/2017 | Blank .................... G06Q 40/12 |
| 10,515,375 B2 * | 12/2019 | Tharmananthar ...... G06Q 40/04 |
| 10,991,040 B2 * | 4/2021 | Blank .................. G06Q 40/025 |
| 11,270,274 B1 * | 3/2022 | Kurani ................... G06Q 40/02 |
| 2001/0037284 A1 | 11/2001 | Finkelstein |
| 2003/0033240 A1 | 2/2003 | Balson et al. |
| 2004/0039689 A1 * | 2/2004 | Penney ................ G06Q 40/025 |
| | | 705/38 |
| 2005/0171892 A1 | 8/2005 | Naas et al. |
| 2006/0253361 A1 | 11/2006 | Robinson |
| 2007/0100742 A1 | 5/2007 | Grossman |
| 2007/0233594 A1 | 10/2007 | Nafeh |
| 2007/0276744 A1 | 11/2007 | Burke |
| 2008/0120213 A1 | 5/2008 | Morik |
| 2008/0215480 A1 | 9/2008 | Mordecai |
| 2008/0306881 A1 | 12/2008 | Feldman |
| 2009/0063323 A1 | 3/2009 | Caffrey |
| 2009/0192946 A1 | 7/2009 | Buckmaster |
| 2009/0276370 A1 | 11/2009 | Olson et al. |
| 2009/0299895 A1 | 12/2009 | Fitzpatrick |
| 2010/0030705 A1 | 2/2010 | Tharmananthar |
| 2010/0169205 A1 | 7/2010 | Labuszewski et al. |
| 2010/0228665 A1 | 9/2010 | Mathieson |
| 2010/0250466 A1 | 9/2010 | Joseph |
| 2011/0191233 A1 | 8/2011 | Russo et al. |
| 2011/0231307 A1 | 9/2011 | Caffrey |
| 2011/0313906 A1 | 12/2011 | Jin |
| 2012/0022995 A1 | 1/2012 | Lange |
| 2012/0150715 A1 | 6/2012 | Boudreault |
| 2012/0259796 A1 | 10/2012 | Blank |
| 2013/0318006 A1 * | 11/2013 | Morik .................... G06Q 40/06 |
| | | 705/36 R |
| 2014/0129416 A1 | 5/2014 | Boudreault |
| 2014/0180907 A1 * | 6/2014 | Blank .................. G06Q 40/025 |
| | | 705/38 |
| 2014/0188691 A1 * | 7/2014 | Blank .................... G06Q 40/04 |
| | | 705/37 |
| 2014/0279697 A1 * | 9/2014 | Blank .................... G06Q 40/06 |
| | | 705/36 R |
| 2015/0032591 A1 | 1/2015 | Jacob |
| 2015/0081501 A1 * | 3/2015 | Chakar .................. G06Q 40/04 |
| | | 705/37 |
| 2015/0081591 A1 | 3/2015 | Chakar et al. |
| 2016/0314530 A1 * | 10/2016 | Blank .................... G06Q 40/04 |
| 2016/0314534 A1 * | 10/2016 | Blank .................... G06Q 40/06 |
| 2018/0158142 A1 * | 6/2018 | Gunther ................ G06Q 40/04 |
| 2020/0382276 A1 * | 12/2020 | Umemoto ............ H04L 9/0637 |
| 2021/0319442 A1 * | 10/2021 | Chapiewski .......... H04L 63/102 |

* cited by examiner

| Step | Action | Dealer (Leg 1) | Investor (Leg 2) |
|---|---|---|---|
| 1 | Dealer (Leg 1) creates a new trade. Principal Amount: 100 | • Settled Principal Amount: 0<br>• Pending DVP Credit: 100<br>• Incremental Credit: 0 | • Pending RVP Debit: 100<br>• Incremental Debit: 0 |
| 2 | Dealer (Leg 1) allocates 60 collateral value of Position A to the new trade. | • Pos A: 60 (Pend Delv) | • Pos A: 60 (Pend Recv) |
| 3 | Incremental settlement of 60 occurs between Dealer (Leg 1) and Investor (Leg 2). | • Settled Principal Amount: 60<br>• Pending DVP Credit: 100<br>• Incremental Credit: 60<br>• Pos A: 60 (Settled Delv) | • Pending RVP Debit: 100<br>• Incremental Debit: 0<br>• Pos A: 60 (Settled Recv) |
| 4 | Dealer (Leg 1) allocates additional 40 collateral value of Position B to the new trade. | • Pos A: 60 (Settled Delv)<br>• Pos B: 40 (Pend Delv) | • Pos A: 60 (Settled Recv)<br>• Pos B: 40 (Pend Recv) |
| 5 | Incremental settlement of 40 occurs between Dealer (Leg 1) and Investor (Leg 2). Full settlement of 100 is reached. | • Settled Principal Amount: 100<br>• Settled DVP Credit: 100<br>• Incremental Credit: 0<br>• Pos A: 60 (Settled Delv)<br>• Pos B: 40 (Settled Delv) | • Pending RVP Credit: 100<br>• Incremental Debit: 0<br>• Pos A: 60 (Settled Recv)<br>• Pos B: 40 (Settled Recv) |
| | Net Effect: | Settled DVP Credit: 100 | Settled RVP Debit: (100) and Real-Time Rehypothecated/Reused Positions |

FIG. 4

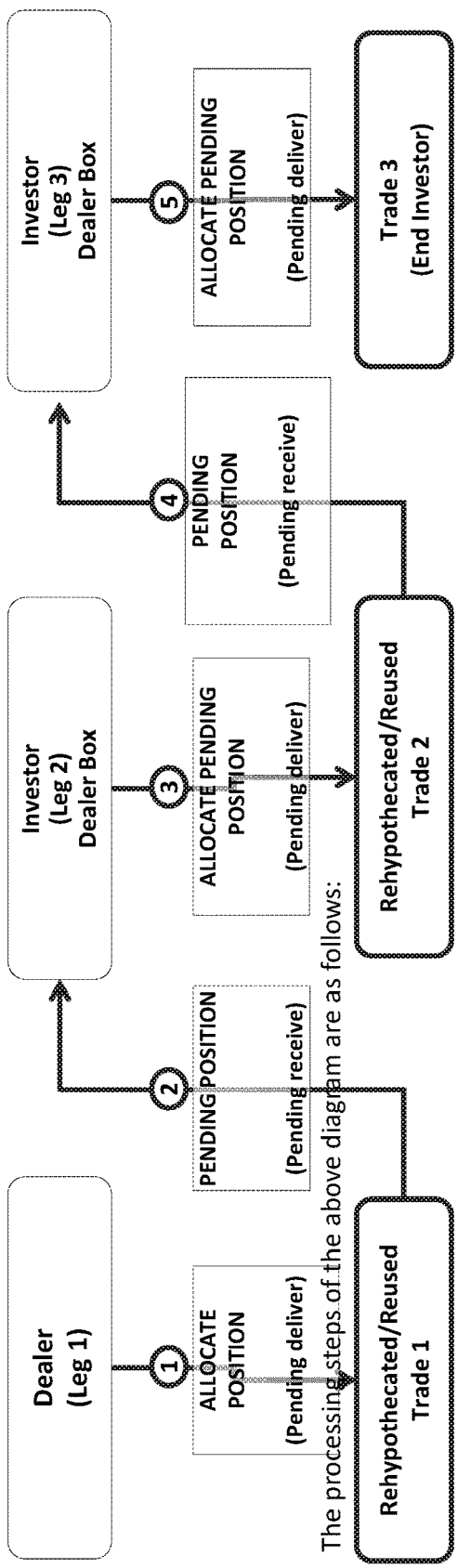

FIG. 5

| Step | Action |
|---|---|
| 1 | In the Real-Time Rehypothecated/Reused Trade 1, the Dealer (Leg 1) allocates a Real-Time Rehypothecated/Reused position to their Investor. The system pends (copies) the position to the Investor (Leg 2). This trade is represented as a Pending deliver to the Investor (Leg 2). |
| 2 | Upon allocation of the Pending (copied) position from the Dealer (Leg 1), the Investor (Leg 2) receives the Pending (copied) position into its dealer box as a Pending receive. |
| 3 | In the Real-Time Rehypothecated/Reused Trade 2, the Investor (Leg 2) allocates the Pending (copied) position to their Investor (Leg 3). |
| 4 | Upon allocation of the Pending (copied) position from the Investor (Leg 2), the Investor (Leg 3) receives the Pending (copied) position to its dealer box as a Pending receive. |
| 5 | In the Trade 3, the Investor (Leg 3) allocates the Pending (copied) position to their Investor (End Investor). |

| Step | Action |
|---|---|
| 1 | In a new Trade (Leg 1), the Dealer (Leg 1) allocates a Real-Time Rehypothecated/Reused position to their Investor (Leg 2). |
| 2 | The system Pends (copies) the position into the dealer box of the Investor (Leg 2). |
| 3 | The system checks for available liquidity of the Investor (Leg 2). If the Investor (Leg 2) has insufficient available liquidity, the settlement will remain in a Pending state. |
| 4 | If the Investor (Leg 2) has sufficient available liquidity, then the position settles to this Investor's dealer box and the Pending RVP settles. |
| 5 | The Pending DVP of the Dealer (Leg 1) then settles. |

FIG. 6B

| Step | Action | Dealer (Leg 1) | Investor (Leg 2) | Investor (Leg 3) | End Investor | Processing Sequence |
|---|---|---|---|---|---|---|
| 1 | The Dealer (Leg 1) has a new trade/Principal Increase trade. | DVP 100 | RVP (100) | | | 4 |
| 2 | The Investor (Leg 2) has a new trade/Principal Increase trade. | | DVP 100 | RVP (100) | | 3 |
| 3 | The Investor (Leg 3) has a new trade/Principal Increase trade. | | | DVP 100 | | 2 |
| 4 | All Investors allocate Pending positions and the DVP/RVP settlements pend. | | | | | -- |
| 5 | The Investor (Leg 3) funds the Leg 3 Trade. | | | | 100 | 1 |
| | Net Effect: | DVP $100 | $0 | $0 | Rehypothecated/ Reused Collateral | |

| Sequence | Description |
|---|---|
| 1 | The End Investor funds Trade 3 with Investor (Leg 3). |
| 2 | The DVP of Investor (Leg 3) settles using funds from End Investor. The available net cash of Investor (Leg 3) increases by the amount settled. |
| 3 | The increased net cash of Investor (Leg 3) is reserved for the purchase of collateral from the RVP with Investor (Leg 2). This settles the DVP of Investor (Leg 2), and the net cash of Investor (Leg 2) increases by the amount settled. |
| 4 | The increased net cash of Investor (Leg 2) is reserved for the purchase of collateral from the RVP with Investor (Leg 1). This settles the DVP of Investor (Leg 1), and the net cash of Investor (Leg 1) increases by the amount settled. |

FIG. 7B

| Step | Action | Dealer (Leg 1) | Investor (Leg 2) | Processing Sequence |
|---|---|---|---|---|
| 1 | The Dealer (Leg One) has a non-maturing trade. | | Auto Cash Credit (100) | -- |
| 2 | The Dealer (Leg 1) creates a new trade. | DVP 100 | RVP (100) | 2 |
| 3 | The Dealer (Leg 1) allocates to the trade and DVP/RVP settlement goes to a Pending state. | | | -- |
| 4 | The Investor (Leg 2) allocates the Pending position to their non-maturing trade. | | Auto Cash Credit (100) | 1 |
| | Net Effect: | DVP $100 | RVP ($100) and Rehypothecated/ Reused Position | |

| Sequence | Description |
|---|---|
| 1 | The Investor (Leg 2) re-allocates collateral to their non-maturing trade and then Auto Cash is returned to that investor. |
| 2 | Using the increase in the Investor's (Leg 2) net cash position, the system reserves a portion of the net cash position sufficient to settle the purchase of the collateral from the Dealer (Leg 1) and DVP/RVP settlement occurs. |

FIG. 8B

| Step | Action | Dealer (Leg 1) | Investor (Leg 2) |
|---|---|---|---|
| 1 | With available liquidity, the Dealer (Leg 1) performs a substitution from a DTC Release Request on the non-maturing trade against Auto Cash. | • Auto Cash: (100) | • Auto Cash: (100)<br>• Rehype NFE credit : 100<br>• Available credit: 0 |
| 2 | The Dealer (Leg 1) reallocates Position A of 100 to the trade, which pends the deliver from the Dealer (Leg 1) to the Investor (Leg 2).<br>(NOTE: When the delivery pends, the Auto Cash remains in the Investor's trade. There is no return of Auto Cash credit to the Dealer (Leg 1), nor is there a reduction to the Investor's (Leg 2) Real-Time Rehypothecated/Reused NFE). | • Auto Cash: (100)<br>• Pos A: 100 (Pending Delv) | • Auto Cash: (100)<br>• Pos A: 100 (Pending Recv)<br>• Rehype NFE credit : 100<br>• Available credit: 0<br>• Projected net exposure: 0 |
| 3 | The system checks and then calculates the projected net exposure and then checks that the Investor (Leg 2) has sufficient credit to support the projected net exposure. | Pos A: 100 (Settled Delv) | • Auto Cash (100)<br>• Pos A: 100 (Settled Recv)<br>• Rehype NFE credit: 0<br>• Available credit: 0 |
| | Final Net Effect: | $0 | Real-Time Rehypothecated/Reused Collateral |

FIG. 9

| Type | Dealer (Leg 1) Configuration | | Investor (Leg 2) | |
|---|---|---|---|---|
| | Has Funds Or DDA | Has Reverse Cash Dealer | Enforce Investor for NFE/Credit | Investor's RVP Behavior |
| GCF trades | Funds | Yes | Yes | • System auto clones and pends settlement incrementally.<br>• Settle if Investor has sufficient NFE/credit |
| Global to Global Global to Domestic | Funds | No | No | Since there is no reverse cash Dealer, system settles the purchase immediately (Since there is no reverse cash Dealer debit, this is a free receive for the Investor) |
| Mostly for FFE trades | DDA | Yes | No | The system incrementally settles and clones the position to the Investor once the Seller's DDA is funded (a funded DDA assumes the Investor prefunded the Seller's DDA and therefore no additional NFE/credit enforcement is required). |
| Mostly for SAB trades | DDA | No | No | The system incrementally settles and clones the position to the Investor once the DDA is funded. (A funded DDA assumes the Investor prefunded the DDA and therefore no additional NFE/credit check is required. Also, since there is no reverse cash Dealer debit, this is a free receive for the Investor.) |

FIG. 11

SYSTEMS AND METHODS FOR REAL-TIME PROCESSING

FIELD OF THE INVENTION

The invention relates to a computer-implemented system and method for real-time processing.

BACKGROUND OF THE INVENTION

Conventional computer systems process data transactions (also referred to as data interactions) in a specific way. For example, consider a task which may include a number of transactions (e.g., 10 transactions), and completion of a first transaction may depend on the completion of one or more other transactions. However, such transaction processing may have drawbacks. As an example, if an operation for determining whether a criterion for completing a transaction is satisfied is performed every second, and the longest transaction (with respect to time required to complete the transaction) takes 10 hours to complete, it would take at least 36,000 determination operations if all other transactions must wait for the longest transaction to complete prior to being able to complete. In other words, a computer system configured to wait for the longest transaction to complete before completing all other transactions would have to expend the network bandwidth, processing power, memory resources, and/or other computational resources for performance of all 36,000 determination operations and other related operations, thereby (a) consuming significant amount of computing resources and time for completing the transactions, and (b) withholding the computing resources that may otherwise be used for processing other tasks. These and other drawbacks exist. Such transaction processing may have a significant performance impact in various applications, for example, in processing data transactions such as real-time rehypothecation.

SUMMARY OF THE INVENTION

Disclosed are embodiments for processing a data interaction independently of a status of other data interactions in a series of data interactions. For example, a computer system is configured to perform a number of data interactions associated with a number of related data nodes such that a data interaction associated with a data node is completed independently of a status of data interactions associated with the other related data nodes. The data node (e.g., a data structure) may include various types of data (e.g., user data, product data, rehypothecation ("rehype") trade data, or other data). In some embodiments, completing a data interaction associated with a data node may include performing a number of operations such as determining whether a criterion for completing the data interaction associated the data node is satisfied, setting a status of the data node to a value that is indicative of whether the data interaction is complete or pending, or performing one or more operations in response to the status being set to a specific value. By completing the data interaction associated with a data node independent of a status of the data interactions associated with other related data nodes, the number of determining operations that may otherwise be performed while waiting for the data interactions associated with the other data nodes to be completed, would be minimized, thereby reducing at least some computational resources usage related to processing the data interactions, and resulting in an improvement of transaction processing by computer systems.

In some embodiments, the above computer system may be configured to process real-time data interactions such as a rehypothecation ("rehype") interaction (e.g., rehype trade). In a rehype trade, a rehype position (e.g., associated with an asset) may be sold between multiple users in a rehype chain. For example, a rehype position that is sold from user "1" to user "2" can also be resold from user "2" to a "downstream" user, user "3", from user "3" to user "4", and so on, forming a rehype chain. A rehype interaction may be considered "settled" when a user has sufficient liquidity to purchase the rehype position. Rehype interaction data (e.g., whether rehype position is settled or pending, whether a position value (e.g., collateral value) associated with the rehype position is receive pending or receive settled, or other data) associated with each user in the rehype chain may be stored in a corresponding data node, thereby forming a node chain. The computer system may be configured to process a rehype interaction (e.g., "settling" a rehype position) associated with a user in the rehype chain by processing a corresponding data node. For example, processing a rehype interaction (also referred to as settling the rehype interaction) associated with a specific user may include (i) obtaining an availability status of a data node associated with the specific user to determine whether a criterion for settling the rehype interaction is satisfied (e.g., obtaining liquidity information determine whether the specific user has sufficient liquidity to purchase the rehype position), (ii) setting a status in the data node to a specific status indicative of the rehype interaction being "settled" in response to the criterion being satisfied, or (iii) performing one or more operations (e.g., transferring the rehype position from another user to the specific user) in response to the status being set to the specific status.

In some embodiments, the rehype interaction associated with a data node may be processed independently of a status of the rehype interactions associated with the other data nodes. As an example, if the rehype chain has ten users, the rehype interaction data associated with the ten users may be stored in corresponding ten data nodes, and a rehype interaction associated with the third user may be processed (e.g., the rehype position settled) by processing a corresponding third data node independently of a status of the rehype interactions (i) at the upstream data nodes (e.g., nodes associated with the first user and second user), or (ii) at the downstream data nodes (e.g., nodes associated with the fourth to tenth user). Such a computer system provides an advantageous way to process rehype interactions, as described below.

Continuing with the above example of ten users in a rehype chain, in a scenario where (i) the determinations of whether a criterion for settling the rehype interaction is satisfied are performed every second, and (ii) the longest rehype interaction (with respect to settlement time) takes "10" hours (or "3600" seconds) to settle, in a conventional computer system, it would take at least "36,000" determination operations if all other rehype interactions must wait for the longest rehype interaction to settle prior to being able to settle. In other words, a conventional computer system configured to wait for the longest rehype interaction to settle before settling all other rehype interactions would have to expend the network bandwidth, processing power, memory resources, and/or other computational resources for performance of all "36,000" determination operations and other related operations. In contrast, in the disclosed computer system, since the processing of rehype interaction (e.g., determinations and settlement operations) associated with each data node is independent of other data nodes, the number of determination operations would be less than the "36,000" determination operations in various scenarios under the foregoing circumstance, thereby reducing at least some computational resources usage related to determinations in all of these scenarios. Thus, the disclosed embodiments enable computer systems to avoid unnecessary use of network bandwidth, processing power, memory, and other computational resources in processing rehype interactions. Further, the computing resources freed up by completing the processing of the rehype interaction associated with a data node while rehype interactions associated with other data nodes are still processing, may be assigned to process a new data interaction, thereby increasing a throughput of the computer system. In one embodiment, the present invention addresses the problems set forth in U.S. Ser. No. 15/136,596, hereby incorporated by reference in its entirety.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise. In addition, as used in the specification and the claims, the term "or" means "and/or" unless the context clearly dictates otherwise.

BRIEF DESCRIPTION OF THE DRAWINGS

FIG. 4 Illustrates an exemplary process of the incremental settlement of a real-time rehype trade, according to an implementation of the invention.

FIG. 5 illustrates an exemplary process of allocation of a pending real-time rehype position, according to an implementation of the invention.

FIGS. 6A and 6B illustrate an exemplary process of settlement flow of an investor's purchase of real-time rehype collateral using their available liquidity, according to an implementation of the invention.

FIGS. 7A and 7B illustrate an exemplary process of the settlement flow of a dealer's purchase of rehype collateral using liquidity from an investor's available cash, according to an implementation of the invention.

FIGS. 8A and 8B illustrate an exemplary process of the settlement flow of the dealer's purchase of real-time rehype collateral using liquidity from an investor's auto cash, according to an implementation of the invention.

FIG. 9 illustrates an exemplary process of the settlement flow of a real-time rehype collateral purchase on a reallocation of collateral, according to an implementation of the invention.

FIG. 11 illustrates an exemplary table of criteria required to validate certain types of trades, according to an implementation of the invention.

DETAILED DESCRIPTION OF THE INVENTION

The invention relates to settling repurchase agreements based on an investor's available liquidity to purchase the collateral from the dealer. The real-time rehype trade settlement process may include delivering allocated collateral in a pending deliver position (pending Delivery versus Payment [DVP]) from the dealer and copying the collateral to the investor as a pending receive position (pending Receive versus Payment [RVP]). The investor may allocate the pending receive position to their trade, prior to incremental settlement occurring. The settlement for the dealer's pending DVP and investor's pending RVP incrementally pends or settles the trade based on the investor's available liquidity. In one implementation, the settlement may be based on the investor's available liquidity to purchase the collateral from the dealer. In the event the investor does not have sufficient available liquidity, the investor may increase their liquidity by relying on funding from their real-time rehype DVP trade. Upon settlement of their DVP trade, the DVP trade proceeds can be used by the investor to offset their collateral purchase from the dealer.

The investor may also increase liquidity by relying on auto cash credit received from a second leg investor trade. The investor may reallocate a pending receive position to their real-time rehype RVP trade, which will then trigger the return of their auto cash credit. The auto cash credit can be used to offset the collateral purchase from the dealer. The investor may further increase liquidity by relying on the real-time rehype net free equity (NFE) credit that was provided to the investor from the dealer's recall on the purchased collateral. Upon reallocation of the collateral by the dealer, the real-time rehype NFE credit of the investor can be used to offset the collateral purchase.

The real-time rehype settlement process provides the advantage of aligning general collateral finance trades and all other real-time rehype trade processes with DVP/RVP trades. Further, the rehype settlement process provides settlement between the dealer and the investor in real-time. Use of a dealer's available liquidity to enforce the monitoring of the purchase of securities by investors of Real-Time rehype collateral also reduces the risk associated with settlement such as RVP exposure. Investors also have the benefit of no longer being exposed to intraday cash allocation until incremental settlement occurs and may monitor pending securities allocated to their trades.

Figure 1:
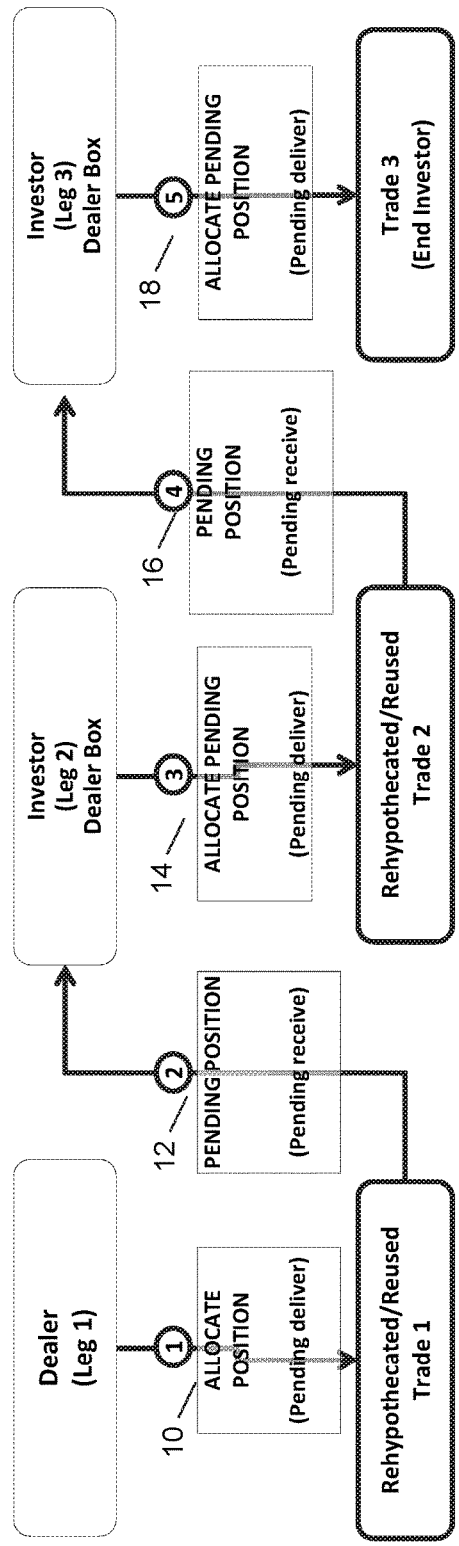
FIG. 1 illustrates a high level flowchart of the allocation of a pending rehypothecation position, according to an implementation of the invention.

Rehypothecation or rehype is the ability to re-use assets that one has received as collateral against an obligation of one's own. Rehypothecation is standard practice in the bilateral market. For example, two parties A and B have a relationship where A acts as the investor and B as the dealer. A delivers collateral to B to meet an obligation against borrowed cash or stock. B then re-uses, or rehypothecates, the collateral to satisfy its own obligation with C. C performs the same exercise as B, satisfying an obligation with D. D is the final lender in the 'rehypothecation chain'. This concept can be extended, with multiple re-use branches across many different counterparties. FIG. 1 illustrates a high level flowchart of the allocation of a pending rehypothecation position. It may be appreciated that the order of the steps listed may be merely exemplary, and in some implementations, one or more steps of the operation may occur in a different order than illustrated, or may occur in conjunction with one another. In a step 10, a dealer (Leg 1) allocates a real-time rehype position to their Investor. The system pends (copies) the position to the Investor (Leg 2). This trade is represented as a pending deliver to the Investor (Leg 2). In a step 12, upon allocation of the pending (copied) position from the dealer (Leg 1), the Investor (Leg 2) receives the pending (copied) position into its dealer box as a pending receive. In a step 14, the investor (Leg 2) allocates the pending (copied) position to their investor (Leg 3). Upon allocation of the pending (copied) position from the investor (Leg 2), in a step 16, the investor (Leg 3) receives the pending (copied) position to its dealer box as a pending receive. In a step 18, the investor (Leg 3) allocates the pending (copied) position to their investor (End Investor).

Figure 2:
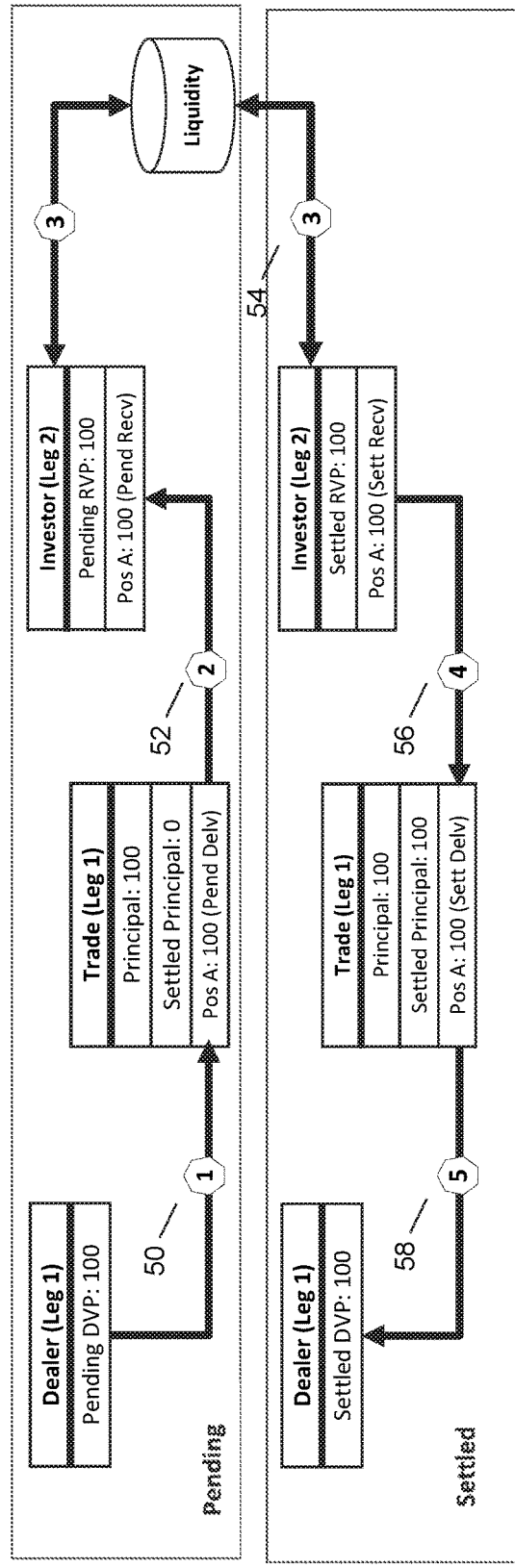
FIG. 2 illustrates a high level flowchart of operation of the real-time rehype settlement process, according to an implementation of the invention.

FIG. 2 illustrates a high level flowchart of operation 10 of the real-time rehype trade settlement process which may be implemented by a computer system (e.g. those maintained at a clearinghouse, or otherwise associated with the Tri-Party dealer). It may be appreciated that the order of the steps listed may be merely exemplary, and in some implementations, one or more steps of the operation may occur in a different order than illustrated, or may occur in conjunction with one another. In an operation 50, for a new Trade (Leg 1), the dealer (Leg 1) allocates a real-time rehype position to their investor (Leg 2). In an operation 52, the system pends (copies) the position into the dealer box of the Investor (Leg 2). In a step 54, the system checks for available liquidity of the Investor (Leg 2). If the investor (Leg 2) has insufficient available liquidity, the settlement will remain in a pending state. In a step 56, if the investor (Leg 2) has sufficient available liquidity, then the position settles to this Investor's dealer box and the pending RVP settles. In a step 58, the Pending DVP of the Dealer (Leg 1) then settles.

Figure 3:
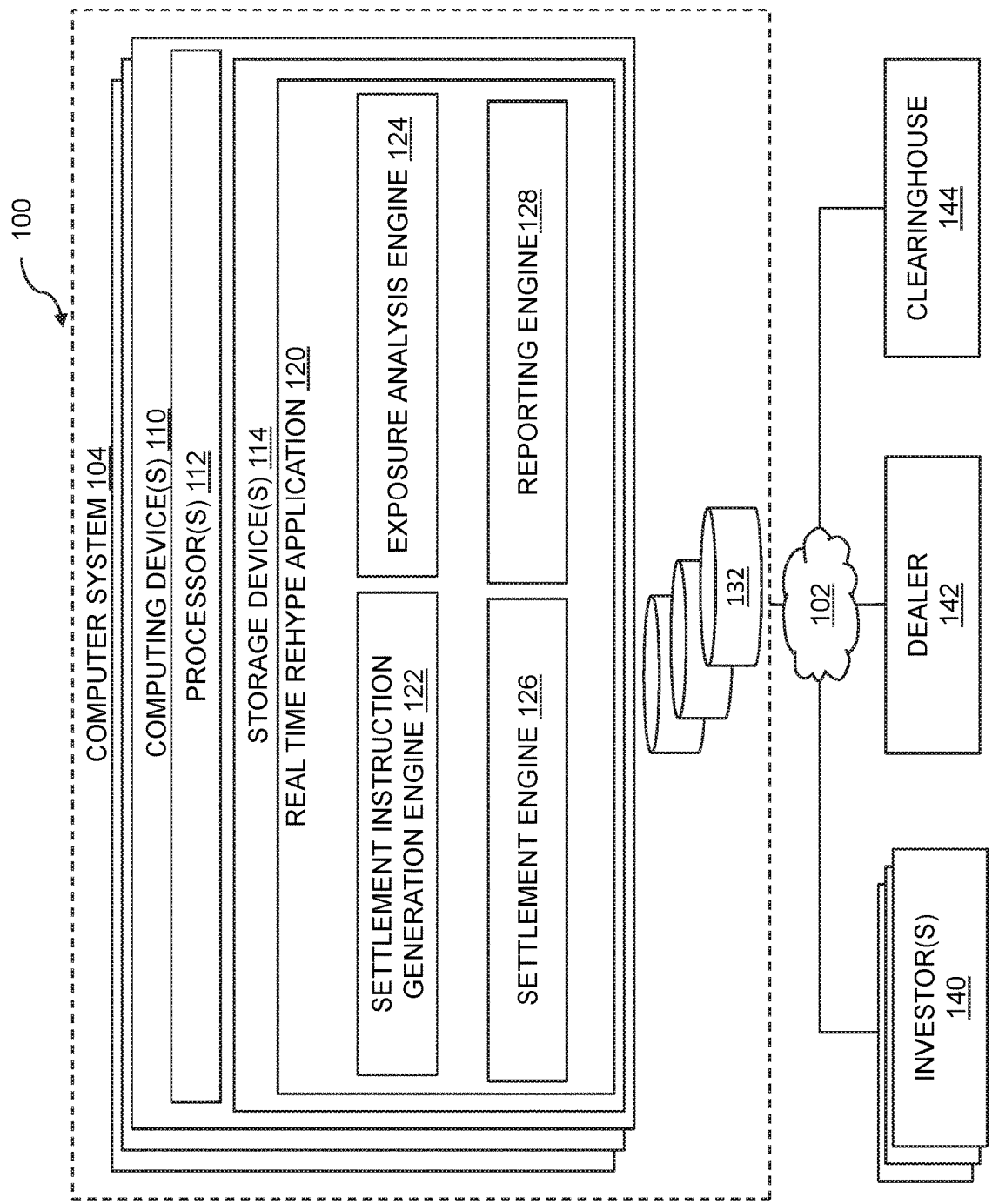
FIG. 3 illustrates a system of real-time rehype settlement, according to an implementation of the invention.

FIG. 3 illustrates a configuration of a high-level system 100 of a real-time rehype trade settlement system, according to an implementation of the invention. The system 100 may settlement collateral of a Tri-Party Repo based on an investor's available liquidity to purchase the collateral from the dealer and settling Tri-Party Repos based on the investor's available liquidity and will be described with particular reference thereto.

Various examples used herein throughout may refer to examples of the real-time rehype trade settlement process system, although other uses and implementations of the system are contemplated and will be apparent to those having skill in the art using the disclosure herein. Having described a high level overview of some of the system functions, attention will now be turned to various system components that facilitate these and other functions.

System Components

System 100 may include a computer system 104, one or more databases 132, one or more investors 140, a dealer 142, a clearinghouse 144, and/or other components. In some implementation, the clearinghouse 144 may be the Tri-Party dealer 142.

To facilitate these and other functions, computer system 104 may include one or more computing devices 110. Each computing device 110 may include one or more processors 112, one or more storage devices 114, and/or other components.

Processor(s) 112 may be programmed by one or more computer program instructions, which may be stored in storage device(s) 114. The one or more computer program instructions may include, without limitation, real-time rehype application 120. Real-time rehype application 120 may itself include different sets of instructions that each program the processor(s) 112 (and therefore computer system 104). For example, real-time rehype application 120 may include a trade allocation engine 122, an exposure analysis engine 124, a settlement engine 126, a reporting engine 128, and/or other instructions that program computer system 104. As used herein, for convenience, the various instructions will be described as performing an operation, when, in fact, the various instructions program computer system 104 to perform the operation.

Operation of Real-Time Rehype Settlement System

In some embodiments, the computer system 104 is configured to process a real-time rehype trade by processing rehype interactions associated with a user in a rehype chain independently of the rehype interactions associated with other users in the rehype chain. The computer system may store rehype interaction data associated with a user in a data node (e.g., a data structure). As an example, rehype interaction data, such as, whether rehype position is settled or pending, whether a position value (e.g., collateral value) associated with the rehype position is receive pending or receive settled, or other data, may be stored as attributes of the data node. Further, the rehype interaction data associated with different users in the rehype chain may be stored in different data nodes. As an example, if a rehype chain has "10" users (e.g., dealers or investors), the computer system may generate "10" data nodes and store rehype interaction data associated with each user in a corresponding data node. That is, each data node is representative of a user in the rehype chain and is configured to store the rehype interaction data associated with the corresponding user.

In some embodiments, when a first user (e.g., a dealer) issues a request for a rehype trade to a second user (e.g., investor), the computer system generates a real-time dataset, which is representative of a real-time rehype position associated with the rehype trade, and allocates the dataset to a second data node associated with the second user. The computer system copies the dataset to the second data node and sets a node status of the second data node to a pending status, indicating that rehype position with respect to the second user is pending (e.g., not "settled" or a position value (collateral value) associated with the rehype position is not yet received from the first user). Similarly, when the second user issues a request for a real-time rehype trade to a third user (e.g., a second investor), the computer system copies the dataset to the third data node and sets it's node status as pending, indicating that rehype position with respect to the third user is pending. Similarly, any real-time rehype trade request issued to a downstream user causes copying of the dataset to a downstream data node and setting of the node status of the downstream node to pending. That is, if there are ten users in the rehype chain, then rehype positions of each user is copied to a corresponding node in the node chain.

In some embodiments, the computer system may process a rehype interaction (e.g., settle the rehype position) associated with a specific data node independently of a status of the rehype interaction associated with the other data nodes of the node chain (e.g., downstream nodes or upstream nodes). In some embodiments, processing a rehype interaction includes periodically obtaining an availability status of the specific data node (e.g., which is indicative of a liquidity of a specific investor associated with the specific data node), determining whether the availability status satisfies a criterion (e.g., whether the liquidity is enough to purchase the rehype position), retaining the node status as pending in response to the availability status not satisfying the criterion, or setting the node status to a settled status (e.g., indicating that the rehype position with respect to the user is settled) in response to the availability status satisfying the criterion. In some embodiments, setting the node status as settled indicates that the specific investor has enough liquidity to purchase the rehype position from another user who issued a rehype trade request to the specific investor. Further, setting the node status as settled may include the computer system performing one or more operations, such as (i) copying the position value (e.g., allocated collateral) to the specific data node as settled received position, indicating that the specific user received the rehype position from the other user who issued the real-time trade request, (ii) adjusting the liquidity of the specific user (e.g., decrease) to indicate the purchase of the rehype position, or other such operations.

In one implementation, the real-time rehype trade settlement system may settlement collateral of a Tri-Party Repo based on an investor's available liquidity to purchase the collateral from the dealer and settling Tri-Party Repos based on the investor's available liquidity and will be described with particular reference thereto. In one implementation, in rehypothecation trading, the real-time rehype trade settlement system may include delivering allocated collateral in a pending deliver position (pending Delivery versus Payment [DVP]) from the dealer and copying the collateral to the investor as a pending receive position (pending Receive versus Payment [RVP]). The investor may allocate the pending receive position to their trade, prior to incremental settlement occurring. The settlement for the dealer's pending DVP and investor's pending RVP incrementally pends or settles the trade based on the investor's available liquidity. In one implementation, the settlement may be based on the investor's available liquidity to purchase the collateral from the dealer.

For example, in a new rehype trade, the dealer may allocate a real-time rehype position to their investor. The system pends (copies) the position into the dealer box of the investor. The system may check for available liquidity of the Investor to determine whether to settle the trade or not. If the investor has insufficient available liquidity, the settlement will remain in a pending state. However, if the investor has sufficient available liquidity, then the position settles to this investor's dealer box and the pending trade settles.

Allocating and Pending Positions

In one implementation, a trade allocation engine may allocate a real-time rehype position to their investor. In response to allocating the real-time rehype position, the trade allocation engine pends (copies) the position into the dealer box of the investor. Thus, the trade is put in a pending state and not settled until a determination of the investor liquidity is complete. In other words, all trades are given a pending status until a determination that the investor liquidity is sufficient to settle the position.

Exposure Limit and Analysis

In one implementation, exposure analysis engine analyzes the liquidity of the investor to determine has sufficient available liquidity to settle the position. In other words, exposure analysis engine may check for available liquidity of the Investor to determine whether to settle the trade or not. In on implementation, the exposure analysis engine analyzes certain criteria to determine if the Investor can settle the trade without a credit check being performed (in the interim or target states). For example, as shown in the table of FIG. 11, certain criteria must be validated for certain types of trades. In one implementation, the exposure analysis engine determines whether the investor has sufficient available liquidity to settle the position. For example, the exposure analysis engine may determine that a certain investor has sufficient available liquidity if the investor has liquidity to cover the entire position. In another implementation, sufficient liquidity may be determined if only a predetermined threshold (i.e. 75%) of liquidity is available to cover the position. In one implementation, the exposure limits may be set by the user via a user interface. For example, the exposure analysis engine may analyze the available liquidity of the investor based on customized exposure limits.

Settlement of a Rehype Trade

In one implementation, settlement engine may settle the rehype position pending in the dealer box. For example, it is determined that the investor has sufficient available liquidity based on the exposure analysis, the position settles to this investor's dealer box and the pending trade settles. If the investor does not have sufficient available liquidity, the position is not settled with the investor and remains in a pending state.

Retrying a Pending Purchase Request

In one implementation, the settlement engine may perform a retry process. In one implementation, if an investor has zero NFE/available liquidity, the settlement engine will pend the position and will wait for the investor's NFE/available liquidity to increase. In another implementation, the settlement engine may check, at regular intervals, for the investor's NFE/available liquidity to determine if it is sufficient to settle the position. Based on the amount to settle (Auto Cash/settlement cash), if the NFE/available liquidity of the investor is sufficient, the position will be settled. In another implementation, the settlement engine may perform this for each leg of the Real-Time rehype trade independently of the position settlement status of upstream or downstream leg. In another implementation, the settlement engine may continue to perform retries until all the Pending positions are settled. If the investor does not have sufficient NFE/available liquidity to purchase the pending positions from multiple dealers at the same time, the settlement engine may prioritize the settlement of the pending positions based on the allocation order.

Include/Exclude Pending Allocations or Rebalancing

If there is a position that has both pending and settled status, settlement engine may allocate the settled position first, and then allocate the pend position as needed. This applies to the non-settlement Continuous Portfolio Optimization (CPO) allocations. If there are both pending and settled positions in either dealer box or trade or both, any substitution request through CPO/Rebalancing/Release request will always release pending positions first and then the settled positions, since pending positions are treated like excess collateral. For rebalancing in Clone to Projected Mode, pending rehypothecated positions will always be included in the settlement engine by default.

Reporting Engine

In one implementation, a reporting engine may provide a report displaying the positions that are completed, pending, and/or failed. The report may be displayed on a user interface of the computer system and utilized to clean up the process for settlement completion.

Insufficient Liquidity

In the event the investor does not have sufficient available liquidity, the investor may increase their liquidity by relying on funding from their real-time rehype DVP trade. Upon settlement of their DVP trade, the DVP trade proceeds can be used by the investor to offset their collateral purchase from the dealer. The investor may also increase liquidity by relying on auto cash credit received from a second leg investor trade. The investor may reallocate a pending receive position to their real-time rehype RVP trade, which will then trigger the return of their auto cash credit. The auto cash credit can be used to offset the collateral purchase from the dealer. The investor may further increase liquidity by relying on the real-time rehype NFE credit that was provided to the investor from the dealer's recall on the purchased collateral. Upon reallocation of the collateral by the dealer, the real-time rehype NFE credit of the investor can be used to offset the collateral purchase.

Net Free Equity Impact

In an implementation, the pending real-time rehype trade settlement may have an effect on the net free equity (NFE). For example, when there is a Pending deliver for the dealer: the dealer retains the NFE value of the position allocated to the trade, the dealer does not receive an Auto Cash credit because the position allocated has a Pending deliver status, and if there is Auto Cash in the trade, then the Auto Cash will remain in the investor's trade. When there is a pending receive for the investor: the investor maintains the Real-Time Rehypothecated/Reused NFE credit, and the investor's NFE value does not increase due to the Pending position in the dealer box. When the investor allocates a Pending receive position to their trade and there is: no Auto Cash in the trade, then the investor's NFE value does not change, and Auto Cash in the trade, then the Auto Cash can be used by the investor to support the collateral purchase. This will settle the Pending position, and the investor will receive an Auto Cash credit, which will increase their NFE value.

Examples of System Architectures and Configurations

Different system architectures may be used. For example, all or a portion of real-time rehype application 120 may be executed on a server device. In other words, computing device 110 as illustrated may include a server device that obtains a user request from a user device operated by the user. In implementations where all or a portion of real-time rehype application 120 is executed on the server device, the server device may perform the functionality of the real-time rehype application 120.

Although illustrated in FIG. 3 as a single component, computer system 104 may include a plurality of individual components (e.g., computer devices) each programmed with at least some of the functions described herein. In this manner, some components of computer system 104 may perform some functions while other components may perform other functions, as would be appreciated. The one or more processors 112 may each include one or more physical processors that are programmed by computer program instructions. The various instructions described herein are exemplary only. Other configurations and numbers of instructions may be used, so long as the processor(s) 112 are programmed to perform the functions described herein.

Furthermore, it should be appreciated that although the various instructions are illustrated in FIG. 1 as being co-located within a single processing unit, in implementations in which processor(s) 112 includes multiple processing units, one or more instructions may be executed remotely from the other instructions.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 112 may be programmed by one or more additional instructions that may perform some or all of the functionality attributed herein to one of the instructions.

The various instructions described herein may be stored in a storage device 114, which may comprise random access memory (RAM), read only memory (ROM), and/or other memory. The storage device may store the computer program instructions (e.g., the aforementioned instructions) to be executed by processor 112 as well as data that may be manipulated by processor 112. The storage device may comprise floppy disks, hard disks, optical disks, tapes, or other storage media for storing computer-executable instructions and/or data.

The various components illustrated in FIG. 1 may be coupled to at least one other component via a network, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1 and other drawing Figures, different numbers of entities than depicted may be used. Furthermore, according to various implementations, the components described herein may be implemented in hardware and/or software that configure hardware.

The various databases 160 described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

Exemplary Illustrations

FIG. 4. Illustrates an exemplary process of the incremental settlement of a real-time rehype trade. As described in FIG. 4, when a dealer's real-time rehype DVP trade is incrementally settled, the investor's purchase will also incrementally settle. Both the investor and the dealer will then see the incremental fields updated in the following system window or screens, as incremental settlement occurs.

FIG. 5 illustrates an exemplary process of allocation of a pending real-time rehype position.

Figure 6A:
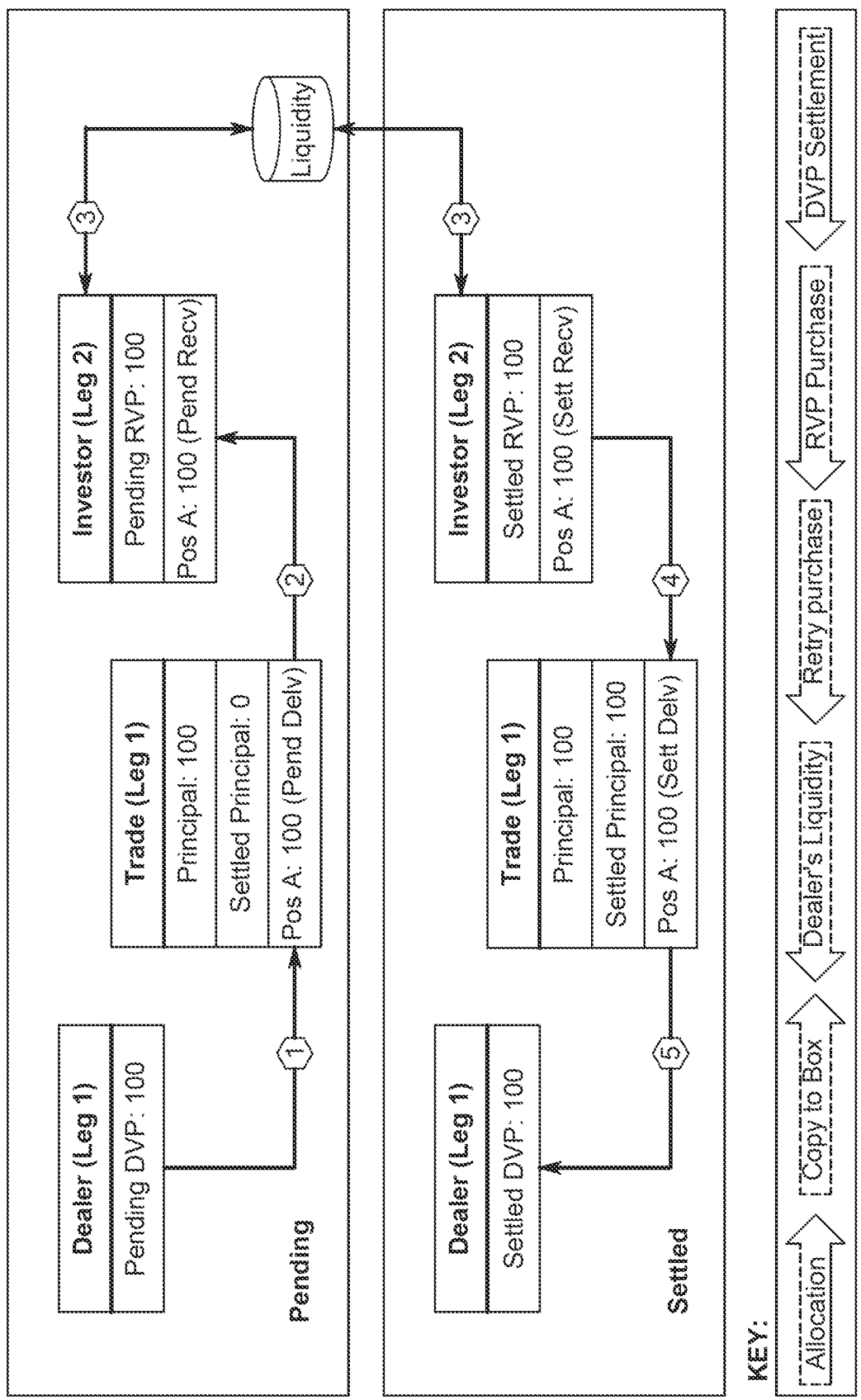

FIGS. 6A and 6B illustrate an exemplary process of settlement flow of an investor's purchase of real-time rehype collateral using their available liquidity.

Figure 7A:
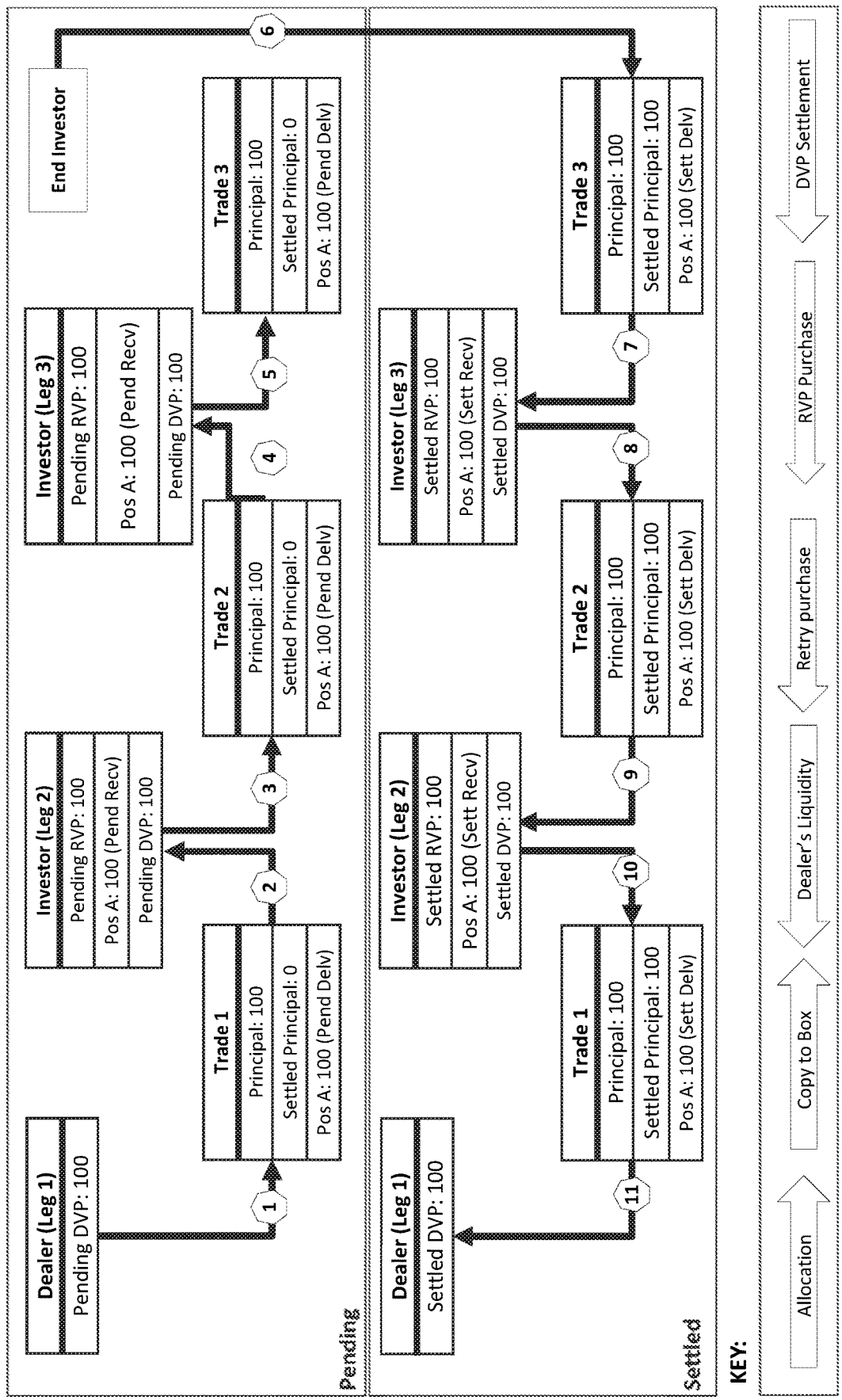

FIGS. 7A and 7B illustrate an exemplary process of the settlement flow of a dealer's purchase of rehype collateral using liquidity from an investor's available cash. The funding received from the end investor increases the investor's available liquidity throughout the chain of the legs of the real-time rehype trade. This increased liquidity may be used to fund the settlement for the upstream investors, resulting in the settlement of the dealer's trade.

Figure 8A:
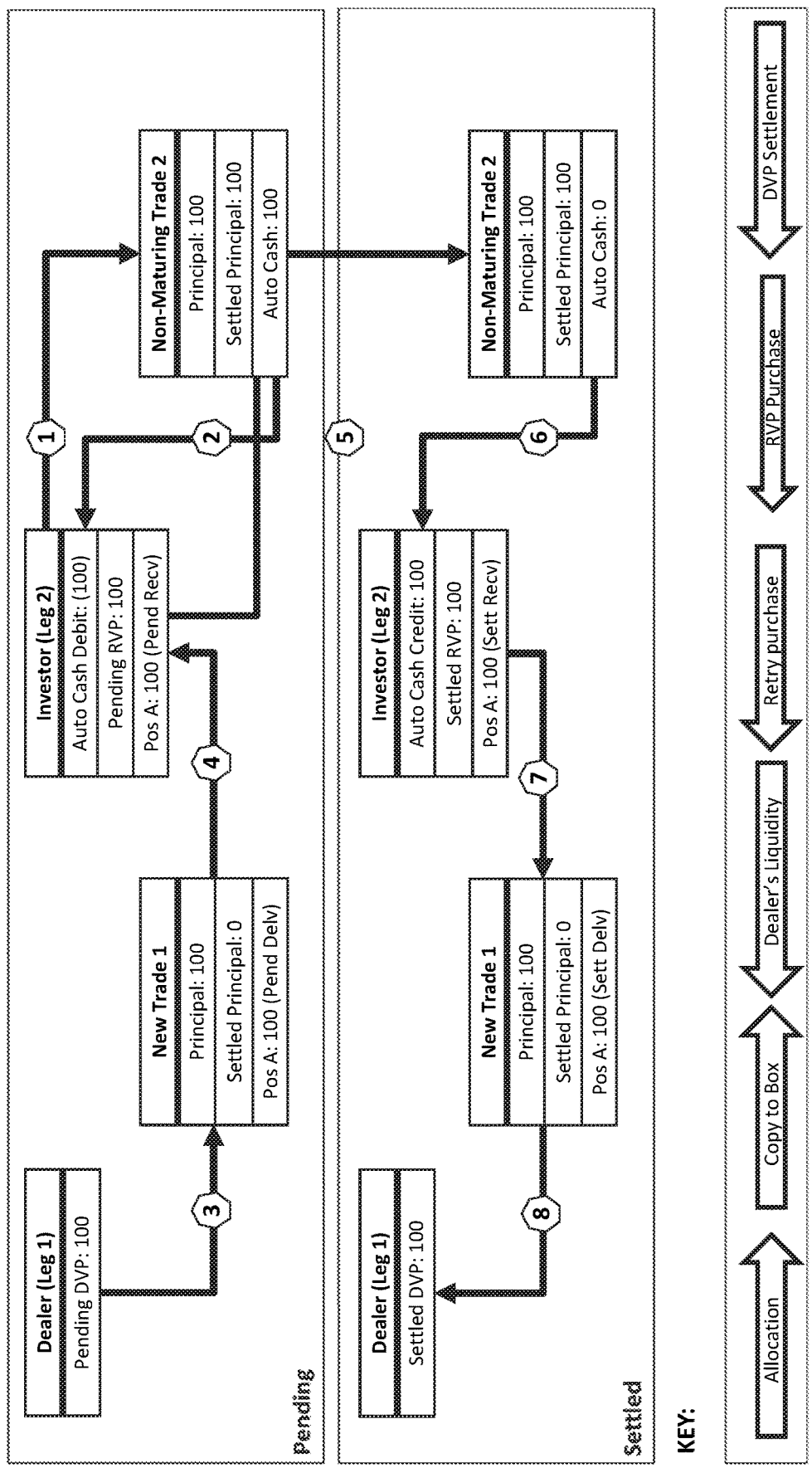

FIGS. 8A and 8B illustrate an exemplary process of the settlement flow of the dealer's purchase of real-time rehype collateral using liquidity from an investor's auto cash. In the diagram, the dealer has performed a release request, which has also substituted a position from the investor's trade against auto cash. The dealer then reallocates a new position to their trade, which pends to the investor. The investor then allocates the pending position to their trade. As a result of auto cash being this trade, the allocation triggers a return of auto cash, which can be used to offset the collateral purchase by the dealer.

FIG. 9 illustrates an exemplary process of the settlement flow of a real-time rehype collateral purchase on a reallocation of collateral. Currently, when requesting collateral from a real-time rehype leg of a trade, the requesting leg and all downstream legs holding that position will receive an auto cash debit for the position released. When the dealer receives an auto cash debit from the substitution of a real-time rehype position, the subsequent downstream legs will also incur auto cash usage, which is offset with real-time rehype NFE (which is equal to the auto cash of the subsequent upstream leg.) However, in the present invention, when the same dealer that had performed the substitution of the real-time rehype position then reallocates the collateral back into the trade, the auto cash is removed from the trade and the subsequent downstream leg(s)' real-time rehype NFE is then reduced. The downstream leg still maintains the auto cash debit without a NFE credit offset. This mitigates this exposure by requiring investors to prefund their depository trust company (DTC) real-time rehype trades. When CLM enforcement is configured for the investor, the prefunding requirement will not be necessary. The system will use the real-time rehype NFE credit to offset the exposure amount, and then the investor will be required to fund the difference.

Figure 10:
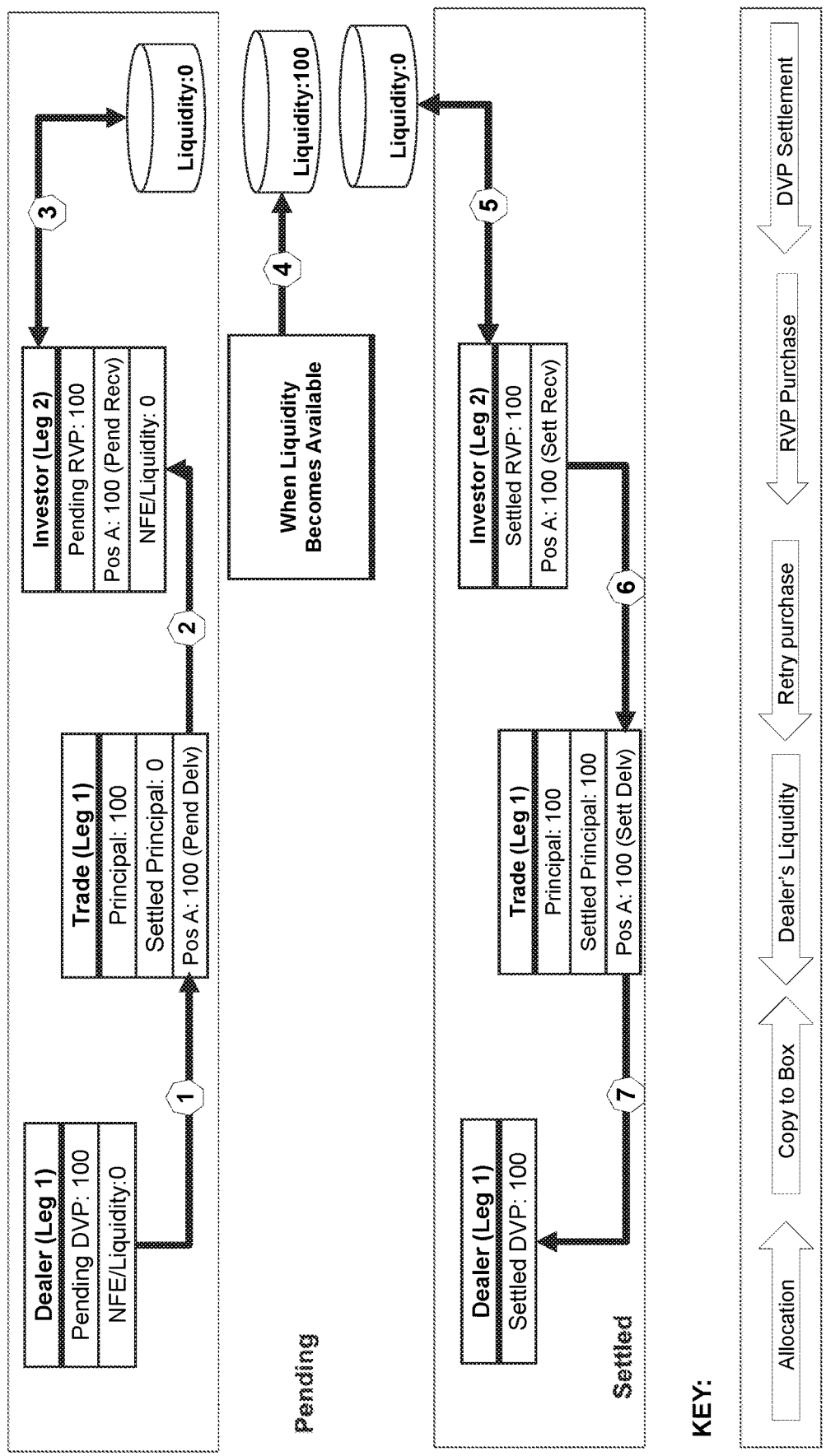
FIG. 10 illustrates an exemplary process of settling a real-time rehype collateral purchase through retry using the investor's available liquidity, according to an implementation of the invention.

FIG. 10 illustrates an exemplary process of settling a real-time rehype collateral purchase through retry using the investor's available liquidity.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A method for real-time processing, the method being implemented on a computer system having one or more physical processors programmed with computer program instructions which, when executed, perform the method, the method comprising:
   allocating, by the computer system, a real-time dataset to a node in a chain of nodes, the real-time dataset associated with a real-time data interaction, the node associated with one or more upstream nodes of the real-time dataset and one or more downstream nodes of the real-time dataset in the chain of nodes, wherein each node is representative of a user in the real-time data interaction;
   setting, by the computer system, a node status of the node for the real-time dataset to pending;
   independently of (i) a node status of the one or more upstream nodes and (ii) a node status of the one or more downstream nodes:
      periodically determining, by the computer system, an availability status of the node, wherein the periodically determining the availability status of the node does not require one or more determination operations over a network that would be required if the periodically determining is dependent on (i) the node status of the one or more upstream nodes and (ii) the node status of the one or more downstream nodes;
      in response to the availability status not satisfying a criterion, retaining the node status as pending; and
      in response to the availability status satisfying the criterion, setting the node status for the real-time dataset as settled;
   allocating, by the computer system and in response to determining the computer system includes a computational resource capacity that satisfies a computational resource capacity requirement for concurrent processing of the first real-time data interaction and a second real-time data interaction, a second real-time dataset to a node in a second chain of nodes, the second real-time dataset associated with the second real-time data interaction;
   setting, by the computer system, a second node status of the node for the second real-time dataset to pending; and
   independently of (i) a second node status of the one or more upstream nodes and (ii) a second node status of the one or more downstream nodes:
      periodically determining, by the computer system, a second availability status of the node for the second real-time dataset, wherein the periodically determining the second availability status of the node does not require one or more determination operations over the network that would be required if the periodically determining is dependent on (i) the second node status of the one or more upstream nodes and (ii) the second node status of the one or more downstream nodes, and wherein the periodically determining the second availability status of the node occurs concurrently with at least a portion of the periodically determining the availability status of the node for the real-time dataset;
      in response to the second availability status not satisfying a criterion, retaining the second node status as pending; and
      in response to the second availability status satisfying the criterion, setting the second node status for the second real-time dataset as settled.

2. The method according to claim 1 further including:
   obtaining a position value associated with the real-time dataset from a first node of the chain of nodes;
   setting a node status of the first node for the position value to a pending deliver position;
   copying the position value to the node and setting the node status of the node for the position value to a pending receive position; and
   determining the availability status of the node based on the pending receive position such that a determination of the availability status of the node satisfying or not satisfying the criterion is based on the pending receive position.

3. The method according to claim 2, wherein setting the node status of the real-time dataset to settled includes:
   setting the node status of the node for the position value to a settled receive position; and
   setting the node status of the first node for the position value to a settled deliver position.

4. The method according to claim 1, wherein determining the availability status of the node includes:
   analyzing criteria of a user represented by the node to determine whether the user can cover a predetermined threshold of the real-time dataset.

5. The method according to claim 1, wherein the real-time dataset is incrementally settled based on the availability status.

6. The method according to claim 1 further including:
allocating a settled position and then a pending position in response to a position that has both pending and settled status.

7. The method according to claim 1 further including:
generating a report displaying positions that are completed, pending, and/or failed.

8. The method according to claim 1, wherein the computer system includes a computational resource capacity that:
satisfies a first computational resource capacity requirement for concurrently processing the periodically determining the availability status for the real-time data interaction and the periodically determining the second availability status for the second real-time data interaction, and does not satisfy at least one of:
a second computational resource capacity requirement for concurrently processing:
the periodically determining the availability status for the real-time data interaction when the periodically determining the availability status for the real-time data interaction is dependent on (i) the node status of the one or more upstream nodes and (ii) the node status of the one or more downstream nodes, and
the periodically determining the second availability status for the second real-time data interaction when the periodically determining the second availability status for the second real-time data interaction is dependent on (i) the second node status of the one or more upstream nodes and (ii) the second node status of the one or more downstream nodes, or a third computational resource capacity requirement for processing:
the periodically determining the availability status for the real-time data interaction when the periodically determining the availability status for the real-time data interaction is dependent on (i) the node status of the one or more upstream nodes and (ii) the node status of the one or more downstream nodes, or
the periodically determining the second availability status for the second real-time data interaction when the periodically determining the second availability status for the second real-time data interaction is dependent on (i) the second node status of the one or more upstream nodes and (ii) the second node status of the one or more downstream nodes.

9. A system for real-time data processing comprising:
a computer system having one or more physical processors programmed with computer program instructions which, when executed, cause the computer system to cause operations comprising:
allocating, by the computer system, a real-time dataset to a node in a chain of nodes, the real-time dataset associated with a real-time data interaction, the node associated with one or more upstream nodes of the real-time dataset and one or more downstream nodes of the real-time dataset in the chain of nodes, wherein each node is representative of a user in the real-time data interaction;
setting, by the computer system, a node status of the node for the real-time dataset to pending;
independently of (i) a node status of the one or more upstream nodes and (ii) the node status of the one or more downstream nodes:
periodically determining, by the computer system, an availability status of the node, wherein the periodically determining the availability status of the node does not require one or more determination operations over a network that would be required if the periodically determining is dependent on (i) the node status of the one or more upstream nodes and (ii) the node status of the one or more downstream nodes;
in response to the availability status not satisfying a criterion, retaining the node status as pending; and
in response to the availability status satisfying the criterion, setting the node status for the real-time dataset as settled;
allocating, by the computer system and in response to determining the computer system includes a computational resource capacity that satisfies a computational resource capacity requirement for concurrent processing of the first real-time data interaction and a second real-time data interaction, a second real-time dataset to a node in a second chain of nodes, the second real-time dataset associated with the second real-time data interaction;
setting, by the computer system, a second node status of the node for the second real-time dataset to pending; and
independently of (i) a second node status of the one or more upstream nodes and (ii) a second node status of the one or more downstream nodes:
periodically determining, by the computer system, a second availability status of the node for the second real-time dataset, wherein the periodically determining the second availability status of the node does not require one or more determination operations over the network that would be required if the periodically determining is dependent on (i) the second node status of the one or more upstream nodes and (ii) the second node status of the one or more downstream nodes, and wherein the periodically determining the second availability status of the node occurs concurrently with at least a portion of the periodically determining the availability status of the node for the real-time dataset;
in response to the second availability status not satisfying a criterion, retaining the second node status as pending; and
in response to the second availability status satisfying the criterion, setting the second node status for the second real-time dataset as settled.

10. The system according to claim 9, wherein the computer system is further programmed to cause operations including:
obtaining a position value associated with the real-time dataset from a first node of the chain of nodes;
setting a node status of the first node for the position value to a pending deliver position;
copying the position value to the node and setting the node status of the node for the position value to a pending receive position; and
determining the availability status of the node based on the pending receive position such that a determination of the availability status of the node satisfying or not satisfying the criterion is based on the pending receive position.

11. The system according to claim 10, wherein setting the node status of the real-time dataset to settled includes:

setting the node status of the node for the position value to a settled receive position; and setting the node status of the first node for the position value to a settled deliver position.

12. The system according to claim 9, wherein determining the availability status of the node includes:

analyzing criteria of a user represented by the node to determine whether the user can cover a predetermined threshold of the real-time dataset.

13. The system according to claim 9, wherein the real-time dataset is incrementally settled based on the availability status.

14. The system according to claim 9, wherein the computer system is further programmed to cause operations including:

allocating a settled position and then a pending position in response to a position that has both pending and settled status.

15. A non-transitory computer-readable medium comprising instructions that, when executed by one or more processors, cause operations comprising:

allocating a real-time dataset to a node in a chain of nodes, the real-time dataset associated with a real-time data interaction, and the node being associated with one or more upstream nodes of the real-time dataset and one or more downstream nodes of the real-time dataset in the chain of nodes, wherein each node is representative of a user in the real-time data interaction;

setting a node status of the node for the real-time dataset to pending; and independently of (i) a node status of the one or more upstream nodes and (ii) a node status of the one or more downstream nodes:

periodically determining an availability status of the node wherein the periodically determining the availability status of the node does not require one or more determination operations over a network that would be required if the periodically determining is dependent on (i) the node status of the one or more upstream nodes and (ii) the node status of the one or more downstream nodes;

in response to the availability status not satisfying a criterion, retaining the node status as pending; and in response to the availability status satisfying the criterion, setting the node status for the real-time dataset as settled;

allocating, by the computer system and in response to determining the computer system includes a computational resource capacity that satisfies a computational resource capacity requirement for concurrent processing of the first real-time data interaction and a second real-time data interaction, a second real-time dataset to a node in a second chain of nodes, the second real-time dataset associated with the second real-time data interaction;

setting, by the computer system, a second node status of the node for the second real-time dataset to pending; and independently of (i) a second node status of the one or more upstream nodes and (ii) a second node status of the one or more downstream nodes:

periodically determining, by the computer system, a second availability status of the node for the second real-time dataset, wherein the periodically determining the second availability status of the node does not require one or more determination operations over the network that would be required if the periodically determining is dependent on (i) the second node status of the one or more upstream nodes and (ii) the second node status of the one or more downstream nodes, and wherein the periodically determining the second availability status of the node occurs concurrently with at least a portion of the periodically determining the availability status of the node for the real-time dataset;

in response to the second availability status not satisfying a criterion, retaining the second node status as pending; and in response to the second availability status satisfying the criterion, setting the second node status for the second real-time dataset as settled.

16. The computer-readable medium according to claim 15, the operations further including:

obtaining a position value associated with the real-time dataset from a first node of the chain of nodes;

setting a node status of the first node for the position value to a pending deliver position;

copying the position value to the node and setting the node status of the node for the position value to a pending receive position; and determining the availability status of the node based on the pending receive position such that a determination of the availability status of the node satisfying or not satisfying the criterion is based on the pending receive position.

17. The computer-readable medium according to claim 16, wherein setting the node status of the real-time dataset to settled includes:

setting the node status of the node for the position value to a settled receive position; and setting the node status of the first node for the position value to a settled deliver position.

18. The computer-readable medium according to claim 15, wherein determining the availability status of the node includes:

analyzing criteria of a user represented by the node to determine whether the user can cover a predetermined threshold of the real-time dataset.

19. The computer-readable medium according to claim 15, wherein the real-time dataset is incrementally settled based on the availability status.

20. The computer-readable medium according to claim 15, wherein the operations further include:

allocating a settled position and then a pending position in response to a position that has both pending and settled status.

* * * * *